United States Patent Office 3,170,874
Patented Feb. 23, 1965

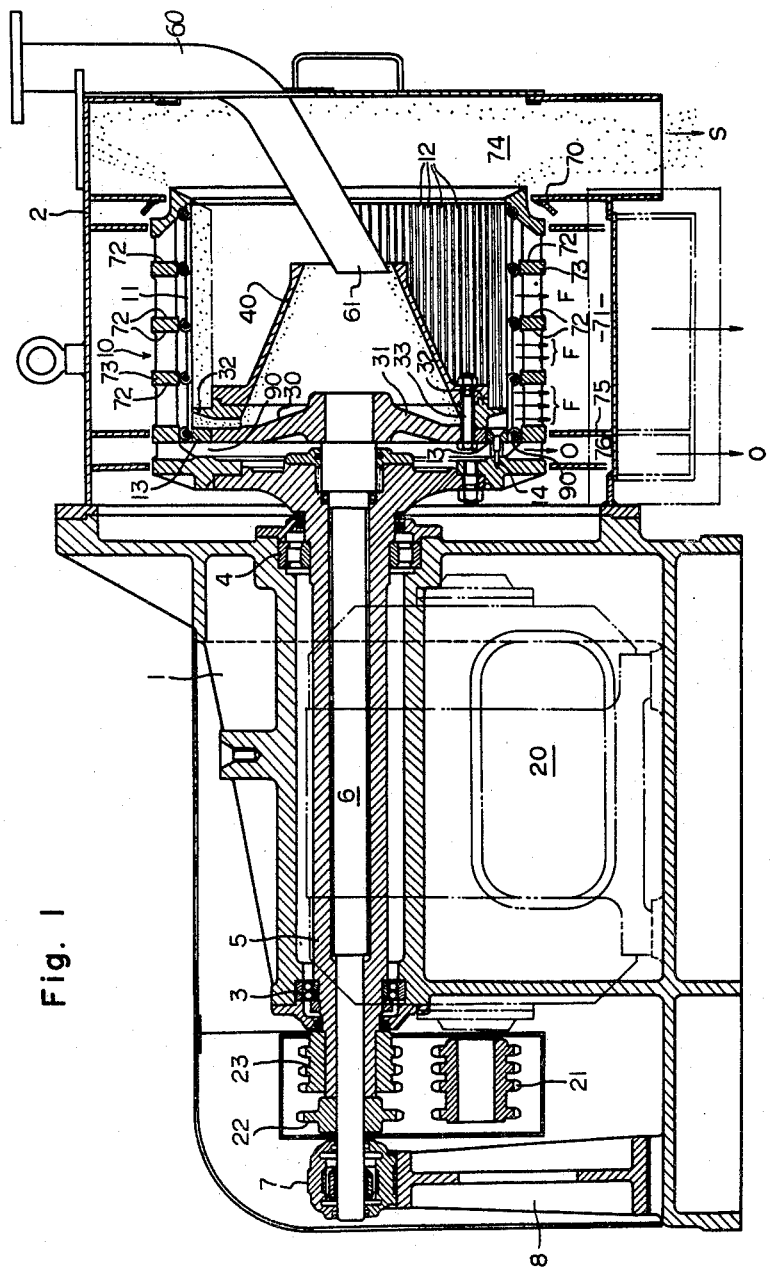

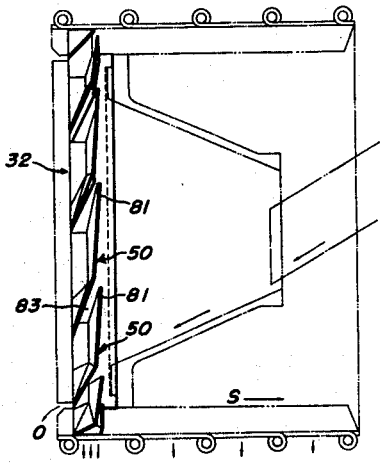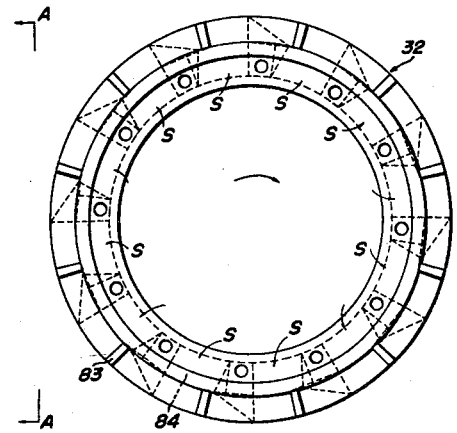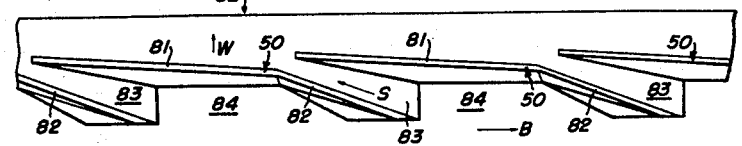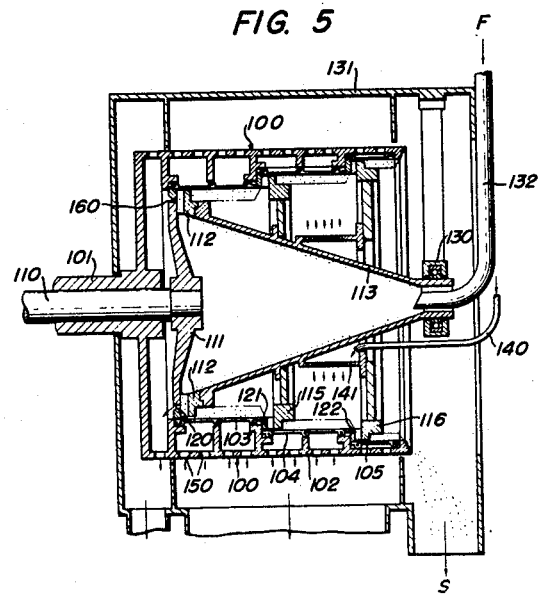

3,170,874
CENTRIFUGAL FILTERS
Toru Iono, 10 Chofu-minemachi, 1-chome, Ota-ku,
Tokyo, Japan
Filed Apr. 26, 1961, Ser. No. 105,781
3 Claims. (Cl. 210—374)

The present invention relates to continuous centrifugal filters and particularly to pusher type continuous centrifugal filters having a horizontally mounted perforated basket.

As is well known, in the manufacture of salt and many other industrial processes, a slurry or a mixture of liquid and solids is subjected to filtration for the separation of the solids. The present invention relates specifically to improvements of the mechanism for transporting the solids separated in the filter to the discharge outlet thereof.

The present invention has for its object to provide centrifugal filters or dehydrators of the kind described adapted to force the solids to completely continuously travel along the inner wall of the basket to the discharge end thereof.

In previous centrifugal filters of the kind described, a pusher member is telescopically mounted in a horizontally mounted perforated basket into which a slurry is introduced and adapted to effect axial reciprocatory movement relative to the basket to force the solids retained on the inner wall thereof to travel along the basket before the solids are pushed over the edge thereof into a dry-solids housing. This arrangement is obviously of intermittent character in operation and usually includes an oil hydraulic assembly for driving the pusher member. The pusher mechanism is thus expensive to manufacture and takes a space which forms a substantial portion of the entire space occupied by the centrifugal filter. The previous pusher type centrifugal filters have, in addition to the above difficulties due to the intermittent solids pushing operation, such deficiencies as deterioration of the product due to damage to solid crystals also caused by the intermittent operation and possible admixture of oil from the hydraulic assembly to the product.

The present invention is intended to overcome such deficiencies by providing a comparatively simple and entirely mechanical means for effecting completely continuous transportation of the solids to the discharge outlet.

According to the present invention, there is provided a continuous centrifugal filter having a cylindrically shaped rotatable basket member having a peripherial wall and a front and rear end. The filter is operable upon a slurry to separate solids therefrom. The filter comprises means for feeding the slurry onto the peripheral wall of the basket member adjacent the rear end thereof and a rotatable pusher member mounted axially of the cylindrical basket member adjacent the inner peripheral wall thereof. In further accordance with the invention, there is provided means for driving the basket member and the pusher member at different speeds of rotation to provide a predetermined speed difference therebetween. The filter further comprises a series of radially extending wedge elements arranged circumferentially and uniformally on the pusher member for pushing forwardly the solids retained on the inner peripheral wall of the basket member upon differential rotation of the latter and the pusher member. The wedge elements each include a front and a rear planar section extending obliquely to a plane normal to the axis of rotation. The front planar section has a smaller obliquity than the rear planar section and overlaps only the rear planar section of an adjacent wedge element to define therewith an inclined convergent solid passageway therebetween.

A specific object of the present invention is to provide a continuous centrifugal filter of the kind described adapted to continuously push forward the solids or cake retained on the inner peripheral wall surface of the basket along paths extending substantially axially but slightly spirally across said wall surface.

In one preferred embodiment of the present invention the rotative pusher member comprises a circular disc carrying a plurality of wedge formations arranged around the periphery thereof and adjacent to the inner peripheral surface of the basket member in equally spaced apart relationship to each other.

The driving means of the filter according to the present invention preferably includes a power motor common to both the perforated basket member and the pusher member.

According to a further embodiment of the present invention, there is provided a multi-stage continuous centrifugal filter having a perforated basket member including a plurality of filtering sections arranged in series on a common axis of rotation and a pusher member including a number of wedge means adapted to cooperate with said respective filtering sections.

These and other objects and advantages will be apparent from the following description when taken with reference to the accompanying drawings which illustrate preferred embodiments of the invention. In the drawings:

FIG. 1 is a vertical axial cross sectional view of one embodiment of the present invention;

FIG. 2 is a side view of the pusher disc of the embodiment shown in FIG. 1;

FIG. 3 is a front view of the pusher disc as seen in the direction indicated by the arrows A—A;

FIG. 4 is an enlarged fragmentary development of the peripheral formation of the pusher disc shown in FIGS. 2 and 3 illustrating the way the solids of the slurry are separated and moved by the wedging action of the pusher disc; and FIG. 5 is a diagrammatic vertical cross section of a multi-stage centrifugal filter according to the present invention.

Referring to the drawings and particularly to FIGS. 1 to 4, there is shown an improved pusher type centrifugal filter having a casing 1 carrying a barrel 2 integrally secured thereto as by welding. In the casing 1 are mounted a pair of bearings 3 and 4 aligned with each other and a hollow outer shaft 5 is journaled in said bearings. Extending through said outer shaft is an inner shaft 6 which projects at one end beyond the outer shaft 5 and is journaled in a separate bearing assembly 7, which is supported by a standard 8 mounted on the adjacent end of the base portion of the filter casing 1.

Housed in the barrel 2 is a rotative perforated basket member generally indicated at 10 which carries on its inner periphery a cylindrical sieve 11 having axially elongated parallel spaced slits 12. Disposed at the rear end of said sieve 11 on the inside thereof is an annular ring 13, which is secured by bolts 14 to the hub portion of the basket member 10.

An electric motor 20 is housed in the casing 1 and is operable to drive the inner and outer shafts 6 and 5 at respective speeds suitably differing from each other through a chain transmission which includes a sprocket wheel 21 directly connected to the shaft of the motor 20 and sprocket wheels 22 and 23 mounted rigid with the inner and outer shafts 6 and 5, respectively, as shown in FIG. 1.

Carried by the inner shaft 6 at the end thereof adjacent to the basket member 10 is a pusher disc generally indicated at 30 having its periphery arranged adjacent to but spaced from the inner periphery of the annular ring 13 on the cylindrical sieve 11. The pusher disc 30 includes a hub portion 31 and an annular pusher ring 32 secured to one side of said hub portion 31 along the peripheral edge thereof by means of bolts 33, one of which is shown in FIG. 1. The bolts 33 also serve to secure an acceleration cone 40 to said hub portion of the pusher disc 30 with the pusher ring 32 interposed therebetween so that the acceleration cone 40 is rotatable with the pusher disc 30. The annular pusher ring 32 carries a plurality of wedge formations 50 circumferentially arranged thereon in equally spaced apart relationship as shown in FIGS. 2 to 4 and as described later in detail. The accelerator cone 40 is open at opposite ends and is formed convergent axially outwardly as shown.

A feed pipe 60 is secured to the filter barrel 2 at its discharge end, i.e. the end remote from the casing 1, the feed pipe 60 opening at the bottom in the receiving end of said acceleration cone 40, as indicated at 61.

The filter barrel 2 supports an annular partition 70 adjacent the discharge end of the barrel to divide the space defined between the rotative basket member 10 and the barrel 2 into two compartments. The inner compartment 71 extends axially along the entire length of the cylindrical sieve 11 to receive the filtrate or liquid expelled through the slits in the sieve 11 and passing through perforations 72 in the cylindrical support structure 73 of the basket member 10, as indicated by the arrows F, while the outer compartment 74 is arranged to receive the solids discharged or pushed over the adjacent edge of the rotating basket member 10 for directing the solids into a solids housing, not shown, as indicated by the arrow S in FIG. 1.

The filter barrel 2 also carries on the inner wall thereof a second annular partition 75 substantially in alignment with the annular ring 13 on the basket member 10 to define a compartment 76 through which any overcharge of slurry may pass out of the filter by gravity.

Wedge formations 50 on the annular pusher ring 32 of the rotative pusher member 30 each project radially outwardly from the peripheral surface of the pusher ring 32 and extend generally circumferentially in overlapping relation to each other. Each of the wedge formations 50 includes two planar sections 81 and 82, as clearly shown in FIG. 4, one planar section 81 being inclined to the plane normal to the axis of rotation of the pusher member 30 to a lesser degree than the other planar section 82. The upper side of the former section 81 as viewed in FIG. 4 is exposed to the interior of the basket member 10 while the latter section 82 overlaps a half portion of the adjacent former section 81 to define an inclined convergent solids passageway 83. The annular pusher ring 32 is formed with radial slots 84 each in communication with a respective passageway 83, on the one hand and with the interior of the acceleration cone 40 on the other hand (see also FIG. 1).

In operation of the centrifugal filter described above, a slurry is fed through the feed pipe 60 into the acceleration cone 40 which is rotating with the pusher disc 30 mounted on the inner shaft 6. The slurry fed in the acceleration cone travels along its inner wall toward the pusher disc 30 in a layer of uniform thickness under an acceleration caused by the centrifugal force which increases with the cone radius. Leaving the inner wall of the cone, the slurry is distributed through the circumferentially spaced apart radial passageways 84, as indicated by the arrow S in FIG. 3, onto the adjacent end of the inner wall of the cylindrical sieve 11 and then passes through the inclined passageways 83 defined between adjacent wedge formations 50 along the inner wall of the sieve 11, while being filtrated or dewatered, to the front side of the wedge formations 50, as indicated by the arrow S in FIG. 4. As pointed out above, the basket member 10 and the pusher disc 30 are rotating at respective speeds so that the annular ring 32 with wedge formations 50 formed thereon effects rotational movement relative to the sieve 11 of the basket member 10, as indicated by the arrow B in FIG. 4. It is to be understood that such relative rotation causes the wedge formations 50, including sections 81 having inclined surfaces exposed to the interior of the cylindrical sieve 11, to effect a wedging action (arrow W in FIG. 4) upon the slurry fed on the exposed side of the wedge formations 50. The slurry is thus forced continuously to travel along paths extending substantially axially but slightly helically across the inner peripheral wall of the cylindrical sieve 11, as indicated by the arrow S in FIG. 2, while being subjected to centrifugal filtration or dewatering. The liquid in the slurry is thus thrown radially outwardly through the slits in the cylindrical sieve 11 and then through the perforations 72 in the support structure 73 of the basket member 10, leaving the solids retained on the inner wall of the sieve 11. The solids are finally pushed over the front edge of the basket member 10 as substantially dry solids, as will readily be understood.

Any overcharge of slurry which exceeds the filtering capacity of the filter is bypassed or overflows through the annular space 90 defined between the periphery of the pusher hub portion 31 and the annular ring 13 mounted on the basket member 10 into the compartment 76 and further to the exterior for recirculation, as indicated by the arrow O in FIGS. 1 and 2. This automatically accommodates for variation in the rate of slurry feed. In addition, where the slurry to be filtered contains solids only in a comparatively small proportion, the slurry may be fed in excess for purpose so that the liquid therein may be separated not only by the filtration of the basket member 10 but also by the overflow of the substantial portion of the liquid through the annular spacing 90.

Referring now to FIG. 5, there is shown a multi-stage centrifugal filter as a modification of the embodiment shown in FIG. 1. The modification is substantially similar to the filter of FIG. 1 except that it comprises a number of filtering sections and is especially suitable for large-scale filtration by a single unit. As is observed, a rotative basket member generally indicated at 100 is formed integral with or rigidly secured to the outer shaft 101 and includes a perforated cylindrical structure 102 and a plurality of cylindrical sieves 103, 104 and 105 substantially of the same construction as the sieve 11 of the first embodiment. The cylindrical sieves 103, 104 and 105 are mounted stepwise on the inside of the cylindrical support 102, and have increasing diameters and decreasing widths in that order so that the sieves may have respective filtering areas appropriate to the dryness of the solids travelling across the respective sieves.

The inner shaft 110 carries at the end a pusher disc 111 including an annular pusher ring 112 and an acceleration cone 113. The pusher ring 112 is substantially the same as the ring 32 of the first embodiment of the invention, having a plurality of circumferentially arranged wedge formations and is axially positioned adjacent to the rear end of the first sieve 103 for the purpose as described above in connection with the first embodiment.

The acceleration cone 113 is rigidly secured to the pusher disc 111 and carries around the periphery two annular pusher rings 115 and 116 axially positioned ad-